(12) United States Patent
Aihara et al.

(10) Patent No.: US 7,736,782 B2
(45) Date of Patent: Jun. 15, 2010

(54) PROTON CONDUCTIVE SOLID POLYMER ELECTROLYTE AND FUEL CELL

(75) Inventors: Yuichi Aihara, Kanagawa Prefecture (JP); Fusaki Fujibayashi, Kanagawa Prefecture (JP)

(73) Assignee: Samsung SDI Co., Ltd., Suwon (KR)

( * ) Notice: Subject to any disclaimer, the term of this patent is extended or adjusted under 35 U.S.C. 154(b) by 1271 days.

(21) Appl. No.: 11/252,559

(22) Filed: Oct. 19, 2005

(65) Prior Publication Data

US 2006/0093886 A1     May 4, 2006

(30) Foreign Application Priority Data

Oct. 20, 2004   (JP) .............................. 2004-305568
Dec. 23, 2004   (KR) ...................... 10-2004-0111375

(51) Int. Cl.
*H01M 8/10*    (2006.01)
(52) U.S. Cl. .............................. 429/33; 429/30; 429/29; 429/306; 521/27
(58) Field of Classification Search ................... 429/33, 429/30, 29, 306; 521/27
See application file for complete search history.

(56) References Cited

U.S. PATENT DOCUMENTS 7,235,320 B2 *   6/2007   Calundann et al. ............ 429/30

2006/0014065 A1   1/2006   Pawlik et al.

FOREIGN PATENT DOCUMENTS

| DE | 101 17 687   | * | 10/2002 |
|----|--------------|---|---------|
| DE | 10117686     | * | 10/2002 |
| JP | 06-111827    |   | 4/1994  |
| JP | 2000-090946  |   | 3/2000  |
| JP | 2001-035509  |   | 2/2001  |
| JP | 2001-167629  |   | 6/2001  |
| JP | 2001-213987  |   | 8/2001  |
| JP | 2002-105129  |   | 4/2002  |
| JP | 2002-198067  |   | 7/2002  |
| JP | 2003-123791  |   | 4/2003  |
| JP | 2005068396   | * | 3/2005  |
| WO | WO 2005007725| * | 1/2005  |

OTHER PUBLICATIONS

Doetze J. Sikkema, "Design, Synthesis and Properties of a Novel Rigid Rod Polymer, PIPD or 'M5': High Modulus and Tenacity Fibres with Substantial Compressive Strength", Polymer, vol. 39, No. 24, pp. 5981-5986, 1998.
Office Action isued by the Japanese Patent Office on Mar. 9, 2010.

* cited by examiner

*Primary Examiner*—Laura S Weiner
(74) *Attorney, Agent, or Firm*—H.C. Park & Associates, PLC

(57) ABSTRACT

A proton conductive solid polymer electrolyte includes a polypyridobisimidazole-based compound and at least an acid. The proton conductive solid polymer electrolyte can be used to make a fuel cell with good power generation over a long period of time under a relative humidity of about 0% to about 50% at an operating temperature of about 100° C. to about 300° C.

12 Claims, 2 Drawing Sheets

PROTON CONDUCTIVE SOLID POLYMER ELECTROLYTE AND FUEL CELL

CROSS REFERENCE TO RELATED APPLICATION

This application claims priority to and the benefit of Japanese Patent Application No. 2004-305568, filed on Oct. 20, 2004 and Korean Patent Application No. 10-2004-0111375, filed on Dec. 23, 2004, which are hereby incorporated by reference for all purposes as if fully set forth herein.

BACKGROUND OF THE INVENTION

1. Field of the Invention

The present invention relates to a proton conductive solid polymer electrolyte that is capable of good power generation over a long period of time even under a relative humidity of about 0% to about 50% and at operating temperatures of about 100° C. to about 300° C., and a solid polymer electrolyte fuel cell employing the same.

2. Discussion of the Background

Ionic conductors are well known in the prior art. Ionic conductors are widely used in electrochemical devices such as fuel cells and electrochemical sensors.

A proton conductor with good proton conductivity over a long period of time at operating temperatures of about 100° C. to about 300° C. and a relative humidity of about 0% to about 50% is preferable in a fuel cell for the purpose of generation efficiency, system efficiency, and long term stability of the components. Conventional solid polymer electrolyte fuel cells that use a perfluorocarbonsulfonic acid membrane as an electrolyte membrane do not generate sufficient power at operating temperatures of about 100° C. to about 300° C. and a relative humidity of less than 50%.

Conventional electrolyte membranes may contain a proton conducting agent (e.g. JP Patent Publication No. 2001-035509) or use a silica dispersion film (e.g. JP Patent Laid-Open Publication No. Hei 06-111827), an inorganic-organic composite film (e.g. JP Patent Publication No. 2000-090946), an phosphoric acid doped graft film (e.g. JP Patent Publication No. 2001-213987), or an ionic liquid composite film (e.g. JP Patent Publication Nos. 2001-167629 and 2003-123791).

These conventional electrolyte membranes do not generate sufficient power over a long period of time at operating temperatures of about 100° C. to about 300° C. and a relative humidity of about 0% to about 50%. The components of phosphoric acid fuel cells, solid oxide fuel cells, and molten salt fuel cells are not stable over a long period of time because they have operating temperatures hotter than 300° C. and are expensive.

U.S. Pat. No. 5,525,436, which is hereby incorporated by reference in its entirety, discloses a solid polymer electrolyte fuel cell capable of generating sufficient power at an operating temperature of 200° C. that is made using a polymer electrolyte membrane composed of polybenzimidazole doped with a strong acid such as phosphoric acid. When phosphoric acid is used as a dopant, 600 mol % or greater with respect to a repeat unit of polymer should be used in order to obtain sufficient ionic conductivity to generate power. Using such a large amount of phosphoric acid causes the amount of polymer contained in the electrolyte membrane to be low and decreases the mechanical strength of the electrolyte membrane.

Despite the advances in the prior art, the need remains to develop a fuel cell with good power generation efficiency, system efficiency, and durability over a long period of time at operating temperatures of about 100° C. to about 300° C. and a relative humidity of about 0% to about 50%.

SUMMARY OF THE INVENTION

The present invention provides a proton conductive solid polymer electrolyte made using a polypyridobisimidazole-based compound and at least an acid. The proton conductive solid polymer electrolyte has good power generation efficiency, good system efficiency, and high durability over a long period of time at operating temperatures of about 100° C. to about 300° C. and a relative humidity of about 0% to about 50%.

The present invention also provides a solid polymer electrolyte fuel cell employing the solid polymer electrolyte that may be used to generate power in vehicles or homes.

Additional features of the invention will be set forth in the description which follows, and in part will be apparent from the description, or may be learned by practice of the invention.

The present invention discloses a proton conductive solid polymer electrolyte including a polypyridobisimidazole-based compound having a repeat unit represented by Formula (1) and at least an acid:

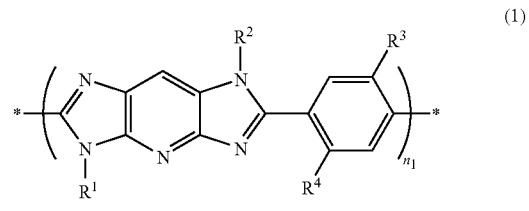

where each of $R^1$, $R^2$, $R^3$, and $R^4$ is selected from a hydrogen atom, a $C_1$-$C_{20}$ alkyl group, a $C_6$-$C_{20}$ aryl group, a sulfonic acid group, a hydroxyl group, a nitro group or an amino group, and n is a number between 10 and 10,000.

The present invention also discloses a fuel cell including an oxygen electrode, a fuel electrode, and an electrolyte interposed between the oxygen electrode and the fuel electrode, where the electrolyte is the proton conductive solid polymer electrolyte described above.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the is principles of the invention.

DETAILED DESCRIPTION OF THE ILLUSTRATED EMBODIMENTS

Figure 1:
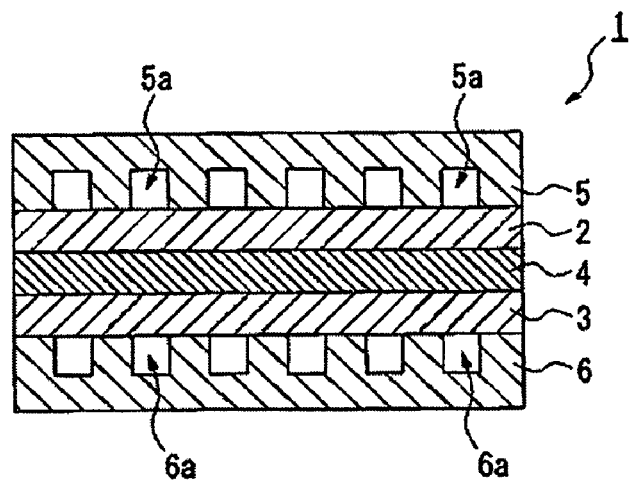
FIG. 1 shows a cross-sectional view of a unit cell of a fuel cell according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

A proton conductive solid polymer electrolyte according to an exemplary embodiment of the present invention includes a polypyridobisimidazole-based compound having a repeat unit represented by Formula (1) and at least an acid:

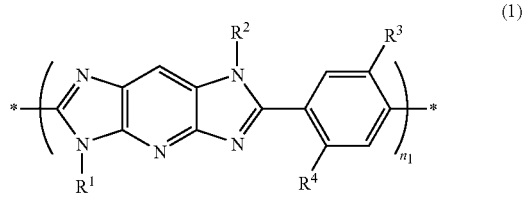

(1)

where each of $R^1$, $R^2$, $R^3$, and $R^4$ is a hydrogen atom, a $C_1$-$C_{20}$ alkyl group, a $C_6$-$C_{20}$ aryl group, a sulfonic acid group, a hydroxyl group, a nitro group or an amino group, and n is a number between 10 and 10,000.

The polypyridobisimidazole-based compound included in the proton conductive solid polymer electrolyte contains a basic pyridine ring in its molecular structure. The polypyridobisimidazole-based compound is more easily doped by an acid than conventional polybenzimidazole-based compounds and promotes the dissociation of acids. Therefore, high proton conductivity can be achieved even when only a small amount of an acid is doped into the polypyridobisimidazole-based compound.

The amount of the polypyridobisimidazole-based compound in the electrolyte membrane can be increased by reducing the amount of acid doped into the polypyridobisimidazole-based compound. This improves the heat resistance and mechanical strength of the electrolyte membrane.

The molecular branches labelled $R^1$ to $R^4$ in Formula (1) increase the intermolecular interaction between the backbones of polypyridobisimidazole chains. This increased interaction further improves the heat resistance and mechanical strength of the electrolyte membrane.

The acid used in the proton conductive solid polymer electrolyte membrane of the present embodiment may be phosphoric acid, phosphonic acid, or a mixture of the two. The content of the acid is preferably about 50 to about 500 mol % per repeat unit of the polypyridobisimidazole-based compound. The electrolyte membrane is not suitable for fuel cells when the content of the acid is less than 50 mol % because the ionic conductivity is only $10^{-4}$ S/cm or less. The electrolyte membrane is not suitable for a membrane electrode assembly of a fuel cell when the content of the acid is greater than 500 mol % because the mechanical strength of the electrolyte membrane is weakened.

The proton conductive solid polymer electrolyte of the present embodiment is not restricted in its form, but has a membrane form when it is interposed between an oxygen electrode and a fuel electrode.

A fuel cell according to an exemplary embodiment of the present invention includes a unit cell that has an oxygen electrode, a fuel electrode, an electrolyte interposed between the oxygen electrode and the fuel electrode, an oxidizing agent bipolar plate with oxidizing agent flow paths disposed on the external surface of the oxygen electrode, and a fuel bipolar plate with fuel flow paths disposed on the external surface of the fuel electrode. The proton conductive solid polymer electrolyte described above may serve as the electrolyte and may also be included in at least one of the oxygen electrode and the fuel electrode.

The fuel cell of the present embodiment will now be described with reference to the attached drawings.

FIG. 1 is a schematic diagram of a unit cell 1 composing the fuel cell according to an exemplary embodiment of the present invention.

Referring to FIG. 1, the unit cell 1 includes an oxygen electrode 2, a fuel electrode 3, a proton conductive solid polymer electrolyte membrane 4 (hereinafter, referred to as an electrode membrane 4) interposed between the oxygen electrode 2 and the fuel electrode 3, an oxidizing agent bipolar plate 5 with oxidizing agent flow paths 5a disposed on the external surface of the oxygen electrode 2, and a fuel bipolar plate 6 with fuel flow paths 6a disposed on the external surface of the fuel electrode 3. The unit cell 1 operates at a temperature between about 100° C. to about 300° C.

The fuel electrode 3 and the oxygen electrode 2 may include an electrode material, such as activated carbon or the like and a binder for solidifying and shaping the electrode material.

The binder may be a fluorine resin with good heat resistance or the polypyridobisimidazole-based compound that is also included in the electrolyte. The output power of the fuel cell is increased when the polypyridobisimidazole-based compound is used as the binder because proton diffusion in the electrodes occurs efficiently with decreased impedance of the electrodes.

The oxidizing agent bipolar plate 5 and the fuel bipolar plate 6 are composed of a conductive metal or the like, and are joined to the oxygen electrode 2 and the fuel electrode 3, respectively, to act as current collectors and supply oxygen and fuel to the oxygen electrode 2 and fuel electrode 3. Hydrogen is supplied as the fuel to the fuel electrode 3 via the fuel flow paths 6a of the fuel bipolar plate 6. Oxygen is supplied as an oxidizing agent to the oxygen electrode 2 via the oxidizing agent flow paths 5a of the oxidizing agent bipolar plate 5. The hydrogen may be supplied in the form of a hydrocarbon or may be supplied by hydrogen produced by the modification of alcohol. The oxygen may be supplied by the oxygen in air.

In the unit cell 1, hydrogen is oxidized at the fuel electrode 3 to produce protons. The protons migrate to the oxygen electrode 2 via the electrolyte membrane 4. The migrated protons react electrochemically with oxygen to produce water and electric energy.

The electrolyte membrane 4 includes the polypyridobisimidazole-based compound having the repeat unit represented by Formula (1) and at least an acid.

In Formula (1), each of $R^1$, $R^2$, $R^3$, and $R^4$ is selected from a group of a hydrogen atom, a $C_1$-$C_{20}$ alkyl group, a $C_6$-$C_{20}$ aryl group, a sulfonic acid group, a hydroxyl group, a nitro group or an amino group. Any of $R^1$, $R^2$, $R^3$, and $R^4$ may be identical to or different from any other of $R^1$, $R^2$, $R^3$, and $R^4$. These molecular branches may promote the intermolecular interaction between the backbones of the polypyridobisimidazole chains to improve the heat resistance and mechanical strength of the electrolyte membrane.

To promote the intermolecular interaction between the backbones of the polypyridobisimidazole chains, at least one of $R^1$, $R^2$, $R^3$, and $R^4$ may be a sulfonic acid group, a hydroxyl group, a nitro group, or an amino group. In an exemplary embodiment, both $R^3$ and $R^4$ may be a hydroxyl group and both $R^1$ and $R^2$ may be a hydrogen atom.

In Formula (1), $n_1$ is preferably a number between 10 and 10,000. The mechanical strength is not sufficient when $n_1$ is less than 10. When $n_1$ is greater than 10,000, the electrolyte membrane is not easily formed because the solubility of the polypyridobisimidazole-based compound cannot be properly controlled.

The polypyridobisimidazole-based compound may be prepared according to a method known in the art. One example is the synthesis method described in the literature (Polymer, vol. 39, No. 24 (1998) p. 5981-5986).

The acid used in the present invention may be phosphoric acid, phosphonic acid, sulfuric acid, trifluoroacetic acid, trifluoromethanesulfonic acid, trifluoromethanesulfoimide acid, or phosphotungstic acid. In an exemplary embodiment, phosphoric acid, phosphonic acid, or a mixture of the two is used to achieve the desired heat resistance, corrosion prevention, volatility, and conductivity.

The present invention will now be described in greater detail with reference to the following examples. The following examples are for illustrative purposes only and are not intended to limit the scope of the invention.

The electrolyte membranes of the following examples were interposed between commercially available electrodes, manufactured by ELECTROCHEM, to form a membrane electrode assembly to evaluate the performance of the fuel cell. The fuel cell was operated using hydrogen and air at 130° C. and 0% relative humidity. 100 mL/min hydrogen and 200 mL/min oxygen were supplied to the fuel cell.

Example 1

Polypyridobisimidazole with the structure represented by Formula (2), where $n_2$=100, shown below was synthesized using 2,3,5,6-tetraaminopyridine and 2,5-dihydroxyterephthalic acid according to the method described in the cited literature (polymer, vol. 39, No. 24 (1998), p. 5981-5986).

The obtained polypyridobisimidazole was dissolved in methanesulfonic acid, cast on a glass substrate, and dried at 120° C. for about 2 days to obtain a dark green film with a metallic luster and 15 μm thick. The film was doped with phosphoric acid by being directly immersed in 105% phosphoric acid at 60° C. for 25 min to form a solid polymer electrolyte membrane. The content of the phosphoric acid in the membrane was determined by the weight change of the film before and after the phosphoric acid immersion to be 185 mol % per repeat unit of the synthesized polypyridobisimidazole. The film was dried in vacuum at 120° C. for 2 hours before being weighed to avoid weighing any moisture that may have been absorbed.

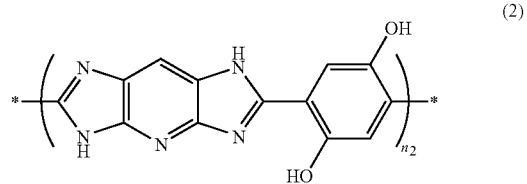

(2)

Figure 2:
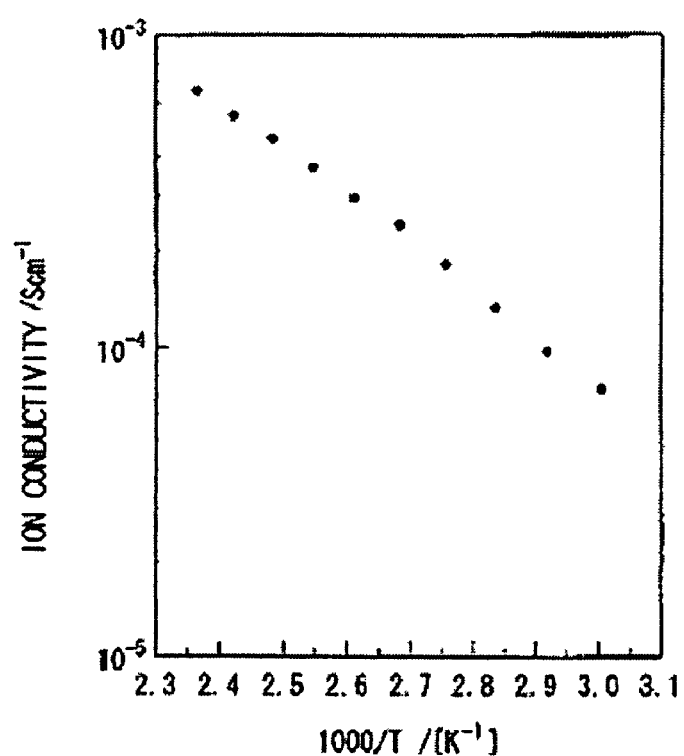
FIG. 2 shows a graph of the dependence of the ionic conductivity on temperature in a fuel cell manufactured according to Example 1.

The impedance of the solid polymer electrolyte membrane was measured by placing it between 2 platinum (Pt) electrodes shaped like coins with a diameter of 13 mm. The dependence of ionic conductivity on temperature was determined using the solution resistance obtained from the impedance. The result is illustrated in FIG. 2. The ionic conductivity at 150° C. is shown in Table 1 below.

Figure 3:
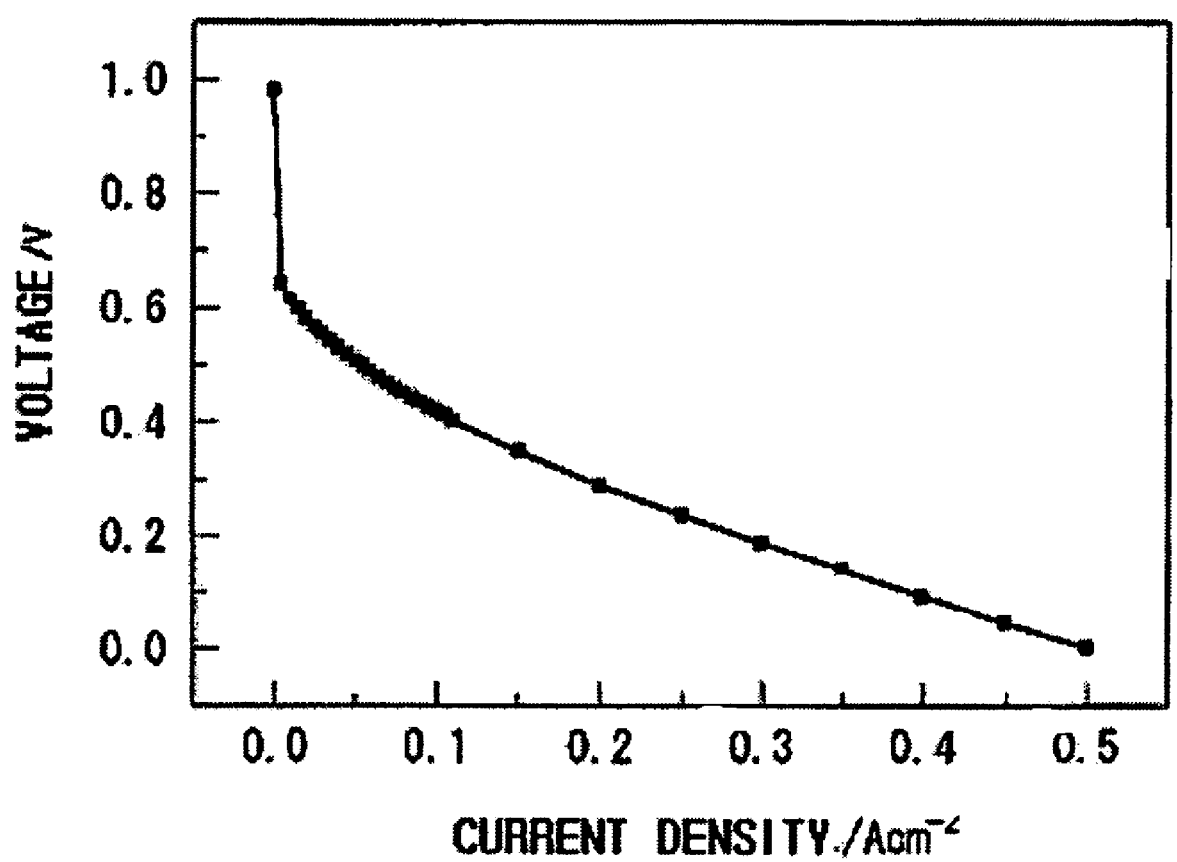
FIG. 3 shows a graph of the relationship between the current density and the output voltage when generating electric power in the fuel cell manufactured according to Example 1.

The power generation characteristics of the fuel cell manufactured using the solid polymer electrolyte membrane were investigated. FIG. 3 is a graph illustrating the relationship between the current density and the output voltage of the fuel cell when generating electric power. The open circuit voltage and the output voltage at a current density of 0.3 A/cm² are given in Table 1.

Example 2

A dark green film prepared in the same manner as in Example 1 was doped with a mixture of 105% phosphoric acid and phosphonic acid to obtain a solid polymer electrolyte membrane. The weight ratio of phosphoric acid to phosphonic acid was 3:2. The doping level of the acid was about 190 mol % per repeat unit of the synthesized polypyridobisimidazole.

A fuel cell was manufactured in the same manner as in Example 1 using the solid polymer electrolyte membrane of Example 2, and its power generation characteristics were investigated.

The ionic conductivity of the fuel cell at 150° C., and the open circuit voltage and the output voltage of the fuel cell at a current density of 0.3 A/cm² are given in Table 1.

Comparative Example 1

Poly-2,2'-(m-phenylene)-5,5'-bibenzimidazole was prepared using the technology disclosed in U.S. Pat. No. 5,525,436, and was doped with 200 mol % of phosphoric acid to obtain a solid polymer electrolyte membrane. A fuel cell was manufactured using the solid polymer electrolyte membrane.

The ionic conductivity of the fuel cell at 150° C., and the open circuit voltage and the output voltage of the fuel cell at a current density of 0.3 A/cm² were measured in the same manner as in Example 1. The results are given in Table 1.

TABLE 1

| | Doping Level (mol %) | Ionic Conductivity (Scm$^{-1}$) @150° C.) | Open Circuit Voltage (V) | Output Voltage (V @ 0.3 Acm$^{-2}$) |
|---|---|---|---|---|
| Example 1 | 185 | $6.7 \times 10^{-4}$ | 0.98 | 0.18 |
| Example 2 | 190 | $7.5 \times 10^{-4}$ | 0.97 | 0.19 |
| Comparative Example 1 | 200 | $8.0 \times 10^{-6}$ | 1.00 | Not measurable |

The electrolyte membranes of Example 1 and Example 2 exhibit higher ionic conductivity than the electrolyte membrane of Comparative Example 1 despite similar doping levels because the acidic dissociation of doped phosphoric acid is promoted by the basic pyridine ring contained in the polypyridobisimidazole molecule and improves proton conductivity. In Comparative Example 1, the phosphoric acid does not contribute sufficiently to the proton conductivity because the acid dissociation of phosphoric acid does not occur as easily as it does in Example 1 and Example 2.

The open circuit voltages of the fuel cells of Example 1, Example 2, and Comparative Example 1 were similar.

At a current density of $0.3 A/cm^2$, the fuel cells of Example 1 and Example 2 exhibited output voltages of about 0.18 V and about 0.19 V, respectively. The unit cell in the fuel cell of Comparative Example 1 had an increased resistance due to the low ionic conductivity of the electrolyte membrane. This made power generation impossible.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A proton conductive solid polymer electrolyte, comprising:
    a polypyridobisimidazole-based compound comprising a repeat unit and an acid,
    wherein the repeat unit is represented by Formula (1):

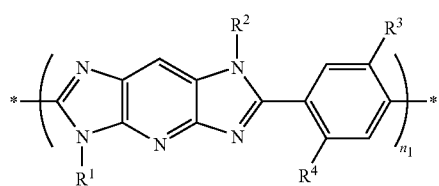

(1)

where each of $R^1$, $R^2$, $R^3$, and $R^4$ is selected from the group of a hydrogen atom, a $C_1$-$C_{20}$ alkyl group, a $C_6$-$C_{20}$ aryl group, a sulfonic acid group, a hydroxyl group, a nitro group and an amino group, wherein at least one of $R^1$, $R^2$, $R^3$, and $R^4$ is selected from the group of a sulfonic acid group, a hydroxyl group, a nitro group, and an amino group; and
$n_1$ is between 10 and 10,000.

2. The proton conductive solid polymer electrolyte of claim 1,
    wherein the acid is phosphoric acid, phosphonic acid, or a mixture of both.

3. The proton conductive solid polymer electrolyte of clam 1,
    wherein the content of the acid is about 50 to about 500 mol % per repeat unit of the polypyridobisimidazole-based compound.

4. The proton conductive solid polymer electrolyte of claim 1,
    wherein $R^1$ is a hydrogen atom, $R^2$ is a hydrogen atom, $R^3$ is a hydroxyl group, and $R^4$ is a hydroxyl group.

5. The proton conductive solid polymer electrolyte of claim 1,
    wherein the polypyridobisimidazole-based compound is a compound represented by Formula (2):

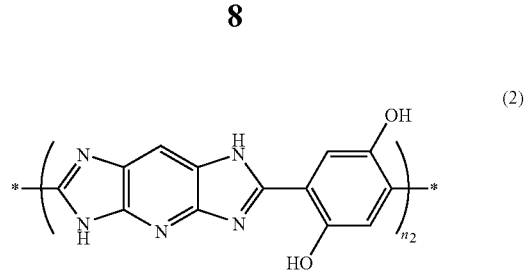

(2)

where $n_2$ is between 10 and 10,000.

6. A fuel cell, comprising:
    an oxygen electrode;
    a fuel electrode; and
    an electrolyte interposed between the oxygen electrode and the fuel electrode,
    wherein the electrolyte is a proton conductive solid polymer electrolyte, comprising a polypyridobisimidazole-based compound comprising a repeat unit and an acid,
    wherein the repeat unit is represented by Formula (1):

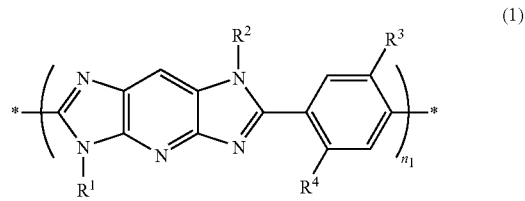

(1)

where each of $R^1$, $R^2$, $R^3$, and $R^4$ is selected from the group of a hydrogen atom, a $C_1$-$C_{20}$ alkyl group, a $C_6$-$C_{20}$ aryl group, a sulfonic acid group, a hydroxyl group, a nitro group and an amino group, wherein at least one of $R^1$, $R^2$, $R^3$, and $R^4$ is selected from the group of a sulfonic acid group, a hydroxyl group, a nitro group, and an amino group; and
$n_1$ is between 10 and 10,000.

7. The fuel cell of claim 6,
    wherein the acid is phosphoric acid, phosphonic acid, or a mixture of both.

8. The fuel cell of claim 6,
    wherein the content of the acid is about 50 to about 500 mol % per repeat unit of the polypyridobisimidazole-based compound.

9. The fuel cell of claim 6,
    wherein $R^1$ is a hydrogen atom, $R^2$ is a hydrogen atom, $R^3$ is a hydroxyl group, and $R^4$ is a hydroxyl group.

10. The fuel cell of claim 6,
    wherein the polypyridobisimidazole-based compound is a compound represented by Formula (2):

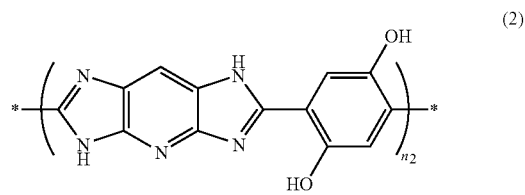

(2)

where $n_2$ is a number between 10 and 10,000.

11. The fuel cell of claim 6,
wherein at least one of the oxygen electrode and the fuel electrode comprises:
a proton conductive solid polymer electrolyte, comprising:
a polypyridobisimidazole-based compound comprising a repeat unit and an acid,
wherein the repeat unit is represented by Formula (1):

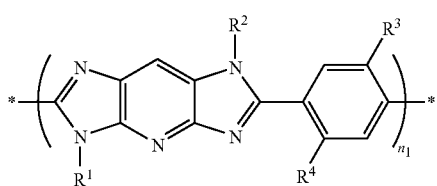

where each of $R^1$, $R^2$, $R^3$, and $R^4$ is selected from the group of a hydrogen atom, a $C_1$-$C_{20}$ alkyl group, a $C_6$-$C_{20}$ aryl group, a sulfonic acid group, a hydroxyl group, a nitro group and an amino group,
and $n_1$ is between 10 and 10,000.

12. The fuel cell of claim 6, further comprising:
a unit cell, comprising:
the oxygen electrode;
the fuel electrode;
the electrolyte interposed between the oxygen electrode and the fuel electrode;
an oxidizing agent bipolar plate that has oxidizing agent flow paths disposed on an external surface of the oxygen electrode; and
a fuel bipolar plate having fuel flow paths disposed on an external surface of the fuel electrode.

\* \* \* \* \*